Nov. 1, 1966   W. CHRISTIANI   3,282,425
COMBINATION CLARIFIER AND STORAGE TANK
Filed Sept. 24, 1963   2 Sheets-Sheet 1

INVENTOR.
WALTER CHRISTIANI
BY
ATTORNEY.

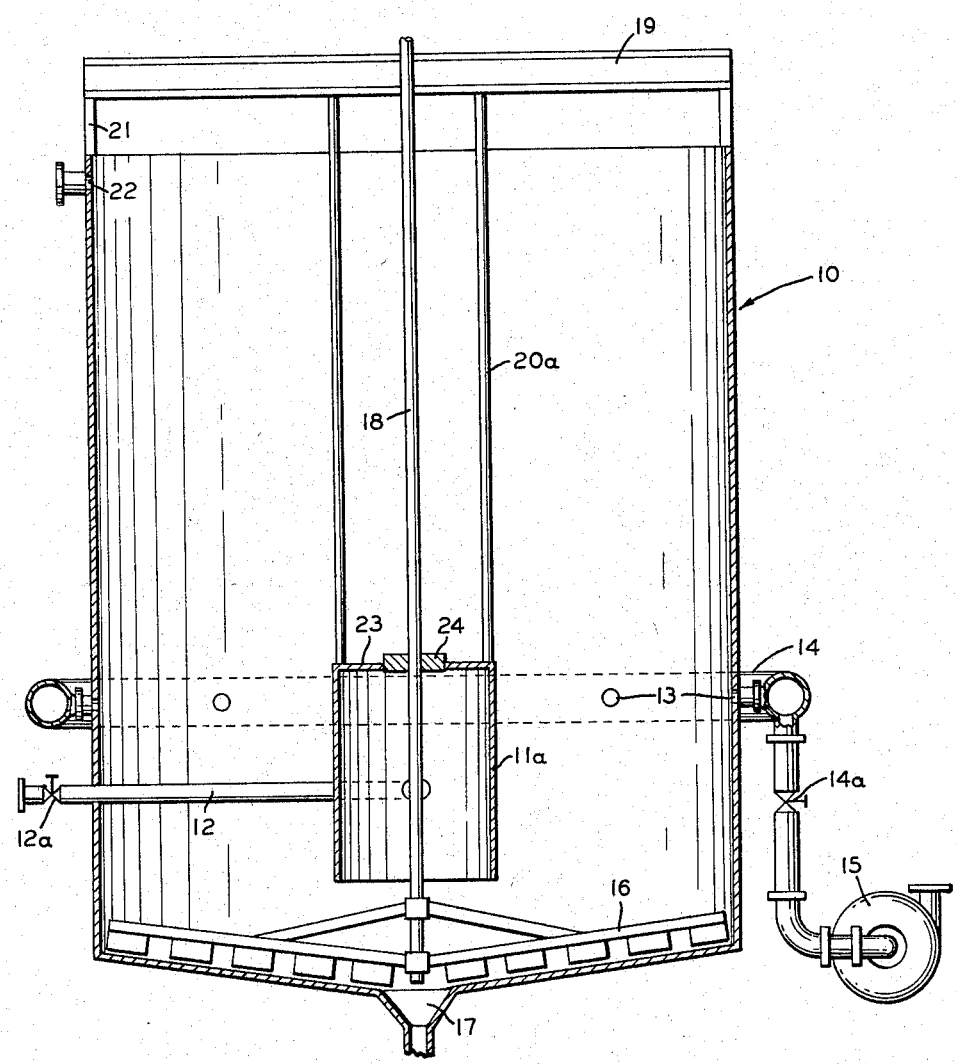

3,282,425
COMBINATION CLARIFIER AND STORAGE TANK
Walter Christiani, Hayward, Calif., assignor to Dorr-Oliver Incorporated, Stamford, Conn.
Filed Sept. 24, 1963, Ser. No. 311,129
Claims priority, application Great Britain, Feb. 21, 1963, 7,096/63
8 Claims. (Cl. 210—83)

This invention relates to improvements in the method and apparatus for clarifying liquids and more particularly to an improved combination clarification, thickening or like settling and storage tank.

In many industrial processes involving the use of clarification and settling tanks the need arises for keeping the tank adequately supplied regardless of fluctuations in the supply of the mother liquor thereto. The usual expedient adopted to even out the feed rate is to provide storage or surge tanks by means of which a reserve supply is built up, but such storage or surge tanks introduce certain difficulties, for example, because the tanks are quite large and often located at different levels, problems of floor space and plant layout develop. Typically, in one field in which the present invention is especially useful, namely in the recausticizing of kraft green liquor such as is used in sulphate pulp processes in the pulp and paper industry, it has been the practice to provide a green liquor surge or storage tank in the flow line between the smelt dissolvers and the green liquor clarifier.

It has been proposed in U.S. Letters Patent 2,852,138— Knight et al. to provide a structure which embodies in a single unit a clarification or settling compartment and facilitates for accommodating surges and supply of mother liquor.

While this structure has overcome some of the problems of the prior art, it suffers from a number of disadvantages notably among which is the requirement that the clarification compartment be physically separated from the storage or surge compartment, such as by a tray. Obviously, this tray is not only expensive to install, but also presents problems in the construction of the tank.

Another objectionable feature of this structure is that the only means of communication between the compartments is through the feedwell and therefore, in the event that it should be necessary to close the clarified effluent discharge outlet, there is no provision for storing clarified liquor since the raw feed liquor which may be partially clarified while maintained in the storage compartment will be reslurried when passing through the feedwell from the upper compartment to the lower clarification compartment.

It is therefore an object of this invention to provide a process and apparatus which will overcome the disadvantages of the prior art.

It is another general object of the present invention to provide an apparatus which provides for the required storage capacity in the same unit as that which is used for clarification.

It is a more specific object of this invention to provide a process and apparatus in which the required storage capacity for clarified liquor is provided in the same unit as that which is used for clarifying, thickening or like treatment.

It is still another object of this invention to provide a process and apparatus in which storage capacity for both raw mother liquor and clarified liquor is provided in the same unit which is used for clarifying, thickening or like treatment.

The present invention accordingly comprises a combined clarification, thickening or like settling and storage tank having a feedwell through which the raw feed liquor is introduced so that the clarified liquid rises in unobstructed tank space surrounding the feedwell for discharge as clarified effluent overflow, while the solids settle downwardly for discharge from a sludge discharge outlet at the bottom of the tank, the clarified effluent overflow discharge outlet being provided at a level appreciably below the top of the tank so that if the feed rate of raw feed liquor being introduced into the tank is increased relative to the normal operating rate of clarified effluent discharge, the clarified effluent liquid level can rise in the tank above the normal discharge level. Thus, if the feed rate of raw feed liquor temporarily exceeds the rate of clarified effluent discharge, as might be the case, for example, in the event that the clarified effluent discharge might need to be closed off for servicing a filter or some other item of equipment to which the clarified effluent liquid normally flows, the feed of raw influent feed liquor does not have to be interrupted. In that event, all that will happen is that the level of the liquid can rise and the clarified effluent will be stored in the tank ready to be discharged when the servicing has been completed.

It is contemplated that appreciable storage space shall be provided, indeed it may be preferred to provide the normal clarified effluent overflow discharge at a level about one-third of the height up from the bottom of the tank so that in fact the tank can provide storage capacity equivalent to about two-thirds its normal operating volume.

Generally, an emergency overflow outlet will be provided near the top of the tank for controlled discharge of clarified effluent in order to prevent the tank from overflowing or perhaps from bursting if the tank is closed. In some cases it may be desirable to provide clarified liquid effluent discharge outlets at several different levels.

In order that it may be clearly understood and readily carried into effect, the invention will now be described, by way of example, with reference to the accompanying drawings, in which:

FIGURE 2 is a similar view showing a modified form of the invention.

Figure 1:
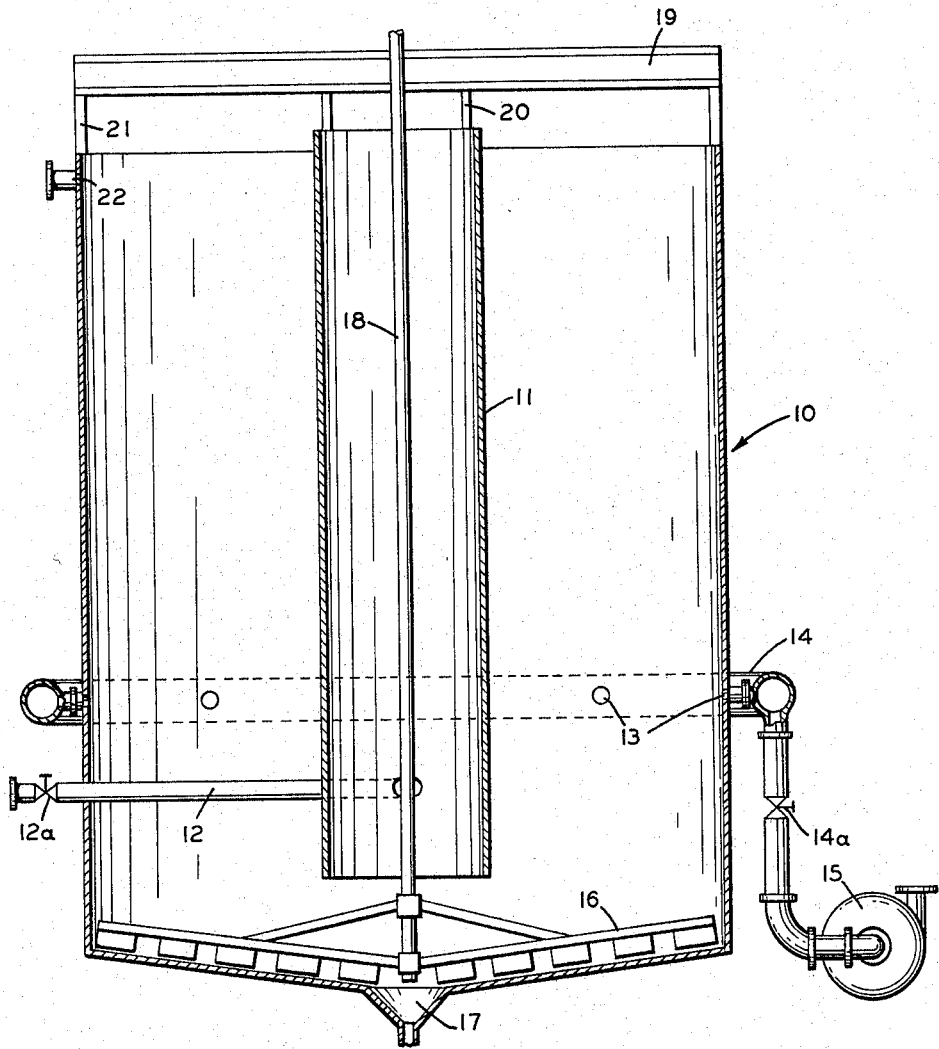
FIGURE 1 represents a sectional elevation taken vertically through substantially the center of a combined clarification and storage tank according to the invention.

In FIGURE 1 the reference numeral 10 indicates generally a tank according to the invention. In the center of the tank a feedwell 11 is provided into which the raw feed liquor to be clarified is introduced through an influent feed conduit 12 controlled by valve 12a. The influent raw feed liquor gravitates downwardly in the feedwell so that the solids settle on the bottom of the tank while the liquid flows out and upwardly and around the feedwell for discharge through the conduits 13 leading into the bustle pipe 14 from which the liquid is pumped by the pump 15, which may be a variable speed or variable capacity type of pump, to a further stage in the processing of the liquor. Bustle pipe 14 may be conveniently provided with a valve 14a for controlling the rate of discharge of clarified effluent.

The usual raking mechanism 16 is provided for raking the settled solids preferably towards the central discharge sump 17 and the rake drive shaft 18 is driven from a motor driven drive head not shown but which can conveniently be mounted on the mechanism support 19 or walkway on the top of the tank. The feedwell may also be suspended from the support 19 by brackets 20 and the support 19 itself may be mounted on brackets 21 extending up from the top of the tank.

The influent raw feed liquor is supplied continuously and in normal operation the clarified effluent liquid is also correspondingly continuously discharged at a controlled rate which will maintain a liquid level at approximately the level of the outlet pipes 13. However, in the event that the feed rate should exceed the discharge rate of clarified effluent liquid, the level will rise in the tank and the clarified liquid will thus be stored in the tank to any desired extent above the normal operating liquid level. It is preferred to provide an overflow outlet 22 near the top of the tank. Generally, however, it is intended that this overflow outlet 22 shall operate only under emergency conditions so that, in the event that the liquid level rises to that extent, the liquid can be discharged and directed to some convenient storage space or to disposal in preference to the liquid having to overflow haphazardly.

It will be noted that as shown in FIGURE 1 the feedwell 11 extends up through the full height of the tank. This may be a considerable advantage in some cases because it provides storage space in the feedwell for influent raw feed liquor above the normal operating level. Thus in the arrangement shown in FIGURE 1 there is faclitiy for storage both for the influent raw feed liquor and for the clarified effluent.

The arrangement shown in FIGURE 2 differs from that shown in FIGURE 1 to the extent that the feedwell in FIGURE 2 extends only a short distance above the normal operating level as controlled by the outlet pipes 13. In this case the feedwell is essentially enclosed at the top by the plate 23 which may incorporate a bearing for the rake mechanism drive shaft 18. This relatively short feedwell 11a can also be suspended by rods 20a as shown in FIGURE 2, which are necessarily longer than the corresponding brackets 20 of FIGURE 1, but in either case the feedwell may be located in any convenient manner. At the cost of not providing much capacity for variation of the feed rate, the construction according to FIGURE 2 does have the advantage that it has greater substantially uninterrupted capacity above the normal liquid level for storage of clarified liquid. Also the top of the short feedwell 11a can be utilized to locate a bearing 24 at an intermediate point of the drive shaft 18.

It is an important feature of the invention that the clarified liquor storage space above the normal operating level is completely unobstructed.

The influent raw feed liquor is preferably introduced just below the operating liquid level in the feedwell. Thus, in the long type of feedwell as shown in FIGURE 1, influent feed conduits could be installed at different elevations with suitable control valves for selective operation at different liquid levels.

With the short type of feedwell according to FIGURE 2 and having a closed top some provision, for example a bleed-off pipe, can be provided for releasing entrained or entrapped air.

The long type of feedwell can be open or closed at the top.

For certain operations the primary consideration may be the storage of raw feed liquor. This could be the case, for example, when the raw feed liquor is fed into a clarifier or like sedimentation tank at spaced intervals for the clarified effluent to be withdrawn continuously at a substantially constant rate. In such an event the feedwell could have a capacity equal to or larger than that of the surrounding annular tank. For such operation it would in many cases be desirable to provide clarified effluent draw-off outlets at different elevations to ensure the draw-off of clarified effluent through the highest of such outlets so that whatever the liquid level in the annulus surrounding the feedwell the clarified liquid would always be drawn off at a point somewhat below the highest level.

Where provision is to be made for operating at different levels either in the feedwell or in the surrounding annulus a float valve or other automatically controlled valves can be installed for opening and shutting the various conduits as the levels change. This could be quite important in the case where the liquid level in the annulus surrounding the feedwell is variable. In that case it would be desirable to ensure that liquid is always drawn off through the highest operable outlet, the lower outlets being shut off to avoid discharge of insufficiently clarified effluent.

From the foregoing description of the various embodiments of this invention it is evident that the objects of this invention, together with many practical advantages, are successfully achieved. While the preferred embodiments of my invention have been described, numerous modifications may be made without departing from the scope of the invention as defined by appended claims. For instance, while a centrally located discharge sump is shown, it will be obvious to those skilled in the art that the sump can be located off center.

Therefore, it is to be understood that all matters herein set forth and as shown in the accompanying drawings are to be interpreted in an illustrative and not in a limiting sense.

I claim:

1. Apparatus for clarifying liquor comprising; tank means having a bottom, a confining marginal wall upstanding therefrom, and means determining the maximum level of liquor in said tank; sediment raking means operably associated with the bottom of said tank for raking settled material towards a sediment discharge outlet; a feedwell mounted in said tank above said raking means, said feedwell being closed to the liquid in said tank except at its lower end portion to discharge feed liquor only from the bottom portion thereof; feed conduit means communicating with said feedwell for introducing raw liquor to be clarified into said feedwell and therefrom into said tank, and clarified effluent discharge means located externally of said feedwell and having at least one effluent receiving opening functionally remote from the lower portion of said feedwell from which said feed liquor is discharged, said opening being located substantially below the upper level of said tank and in hydraulic communication with the portion of said tank above said opening whereby, if the feed rate of raw liquor being discharged through the tank is increased relative to the discharge rate of clarified effluent, the clarified liquid in said tank can rise above said effluent discharge means thus providing storage for the clarified effluent in the portion of the tank above said discharge means.

2. Apparatus according to claim 1 wherein the feedwell extends upwardly to a point substantially above the point at which said feed conduit communicates with the feedwell whereby the feedwell operates as storage for excess raw feed liquor.

3. Apparatus according to claim 2, wherein the feedwell extends upwardly to a position above said maximum level and means venting the upper portion of said well to the atmosphere.

4. Apparatus for clarifying liquor comprising; a tank having a bottom, a confining marginal wall upstanding therefrom, and an overflow conduit determining the maximum level of liquor in said tank; sediment raking means operably associated with the bottom of said tank for raking settled material towards a sediment discharge outlet; a central feedwell mounted in the lower portion of said tank above said raking means, defining below said feedwell a clarification compartment and above said feedwell a clarified liquor storage compartment in unobstructed communication with said clarification compartment, said feedwell being closed to the liquid in said tank except at its lower end portion to discharge feed liquor only from the bottom portion thereof; feed conduit means communicating with said feedwell for introducing raw liquor to be clarified directly into said feedwell and therefrom into said tank; and clarified effluent discharge means having effluent receiving openings located externally of said feedwell and spaced about said feedwell at points functionally remote from the lower portion of said well from which said feed liquor is discharged, said opening being located at points substantially below the upper level of said tank at a point such that at least approximately half of the tank is below said maximum level and above said openings whereby, if the feed rate of raw liquor being discharged through the tank is increased relative to the discharged rate of clarified effluent, the clarified liquor in said tank can rise above said discharge means thus providing storage for the clarified effluent in the portion of the tank above said discharge means.

5. The invention according to claim 4 including a valve in said effluent discharge means for restricting said discharge.

6. Apparatus for clarifying liquor comprising; tank means having a bottom, a confining marginal wall upstanding therefrom and means determining the maximum level of liquor in said tank; sediment raking means operably associated with the bottom of said tank for raking settled material towards a sediment discharge outlet; feed means in said tank above said raking means; feed conduit means communicating with said feed means for introducing raw liquor to be clarified into said tank clarified effluent discharge means located substantially below the upper level of said tank defining therebelow a clarification tank and thereabove a storage tank in substantially unobstructed hydraulic communication with said clarification tank, said clarified effluent discharge means having at least one effluent receiving opening functionally remote from said feed means, means for accumulating in said storage tank substantially without hydraulic obstruction clarified liquor uprising from said clarification tank when the feed rate of raw liquor being fed into the tank is increased relative to the discharge rate of clarified effluent, and means for discharging stored clarified liquor substantially without hydraulic obstruction from said storage tank when the discharge rate is greater than said feed rate.

7. Apparatus according to claim 6 wherein the feed means is closed to the liquid in said tank except at its lower end portion to discharge feed liquor only from the bottom portion thereof.

8. The method of conducting a clarification operation which comprises; establishing in a tank a clarification zone containing liquor undergoing sedimentation, establishing in said tank a storage zone superjacent to said clarification zone containing clarified liquor uprising from said clarification zone, said clarification zone being in substantially unobstructed hydraulic communication with said storage zone, introducing feed liquor into said clarification zone at a substantially constant feed rate, clarifying said feed liquor in said clarification zone, discharging clarified liquor at a controlled rate through a zone between said clarification zone and said storage zone, accumulating in said storage zone substantially without hydraulic obstruction clarified liquor uprising from said clarification zone to store said clarified liquor when said discharge rate is smaller than said feed rate thereby causing the liquid level in the tank to rise and removing said stored clarified liquor substantially without hydraulic obstruction from said storage zone when the discharge rate is greater than said feed rate to allow the level of stored clarified liquor to fall when the discharge rate is greater than said feed rate.

References Cited by the Examiner

UNITED STATES PATENTS

| | | | |
|---|---|---|---|
| 1,494,704 | 5/1924 | Petree | 210—540 X |
| 1,624,382 | 4/1927 | Bartlett | 210—84 X |
| 2,223,634 | 12/1940 | Morton | 210—519 X |
| 2,852,138 | 9/1958 | Knight et al. | 210—528 X |
| 2,854,146 | 9/1958 | Nebolsine et al. | 210—83 X |

FOREIGN PATENTS

| | | |
|---|---|---|
| 474,239 | 10/1937 | Great Britain. |
| 601,936 | 2/1960 | Italy. |

REUBEN FRIEDMAN, *Primary Examiner.*

D. M. RIESS, *Assistant Examiner.*